Figure 3:
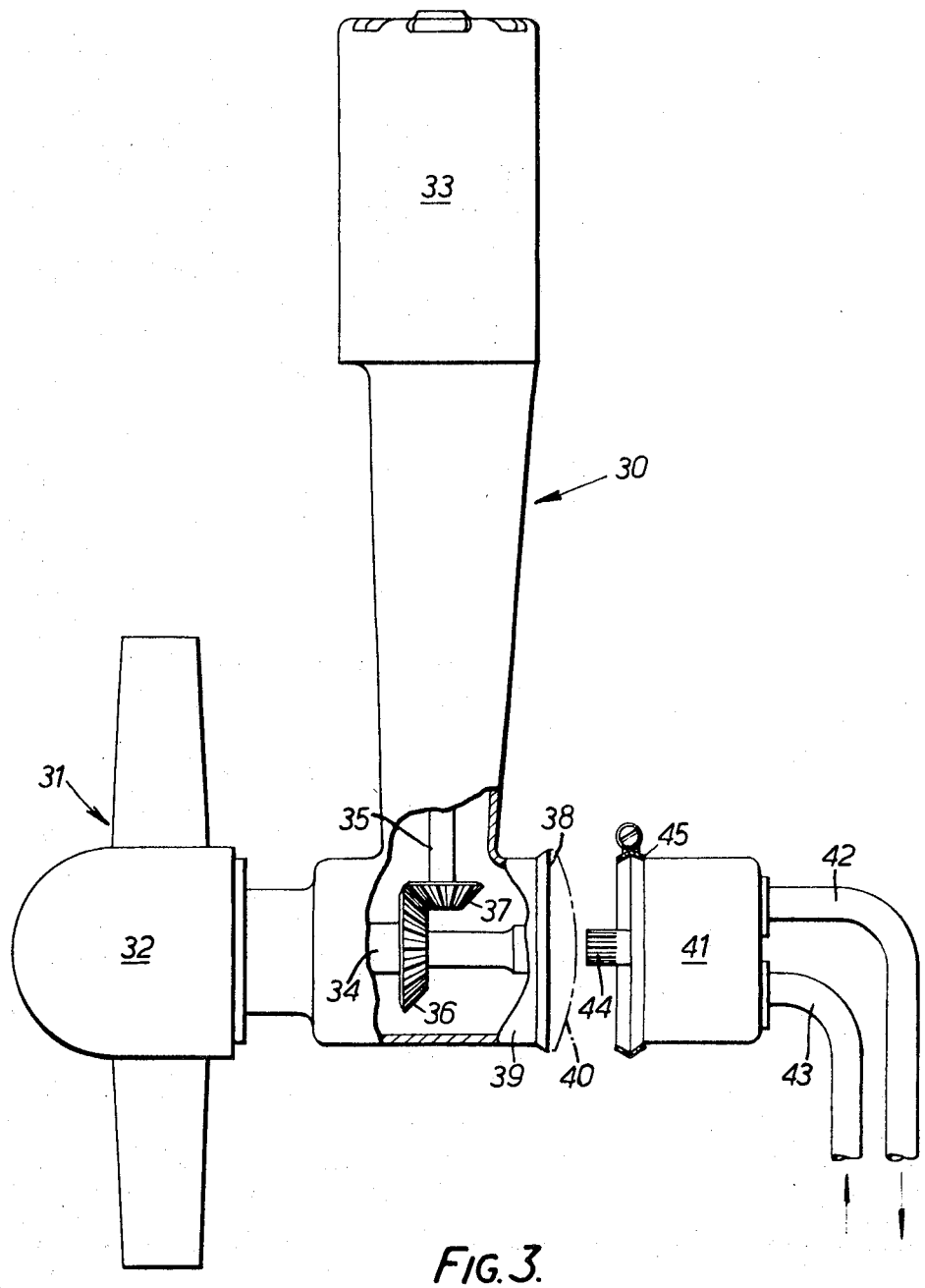

United States Patent

[11] 3,633,411

| [72] | Inventors | Robert Mehew Bass<br>Cranham;<br>John Alfred Chilman, Painswick, both of<br>England |
|---|---|---|
| [21] | Appl. No. | 850,882 |
| [22] | Filed | Aug. 18, 1969 |
| [45] | Patented | Jan. 11, 1972 |
| [73] | Assignee | Dowty Rotol Limited<br>Gloucester, England |
| [32] | Priority | Aug. 28, 1968 |
| [33] | | Great Britain |
| [31] | | 41,010/68 |

[54] TURBINE-TESTING APPARATUS
11 Claims, 5 Drawing Figs.

[52] U.S. Cl................................................ 73/116,
244/58
[51] Int. Cl.......................................................G01m15/00
[50] Field of Search............................................ 244/58;
73/116, 488, 1 R; 416/52, 61, 44, 48; 324/161;
322/29

[56] References Cited
UNITED STATES PATENTS

| 2,715,723 | 8/1955 | Webster | 324/161 UX |
| 2,876,847 | 3/1959 | Blackburn et al. | 416/52 |
| 2,468,635 | 4/1949 | Maystead | 73/1 R |

Primary Examiner—Jerry W. Myracle
Attorney—Young & Thompson

ABSTRACT: Apparatus including in combination a turbine (1), a governor, a rotary device (11) and indicator means (14). The governor is adapted to govern the speed of the turbine by varying the pitch of the turbine blades (2) between their low-pitch position and their high-pitch position. The rotary device is connectable to rotate the hub of the turbine and thereby the blades, for testing the turbine, and the indicator means are adapted to indicate the attainment of the governed speed when the turbine is driven by the device and the power delivered by the device is increased beyond that which the turbine can absorb with the blades in the low-pitch position.

PATENTED JAN 11 1972
3,633,411
SHEET 1 OF 3
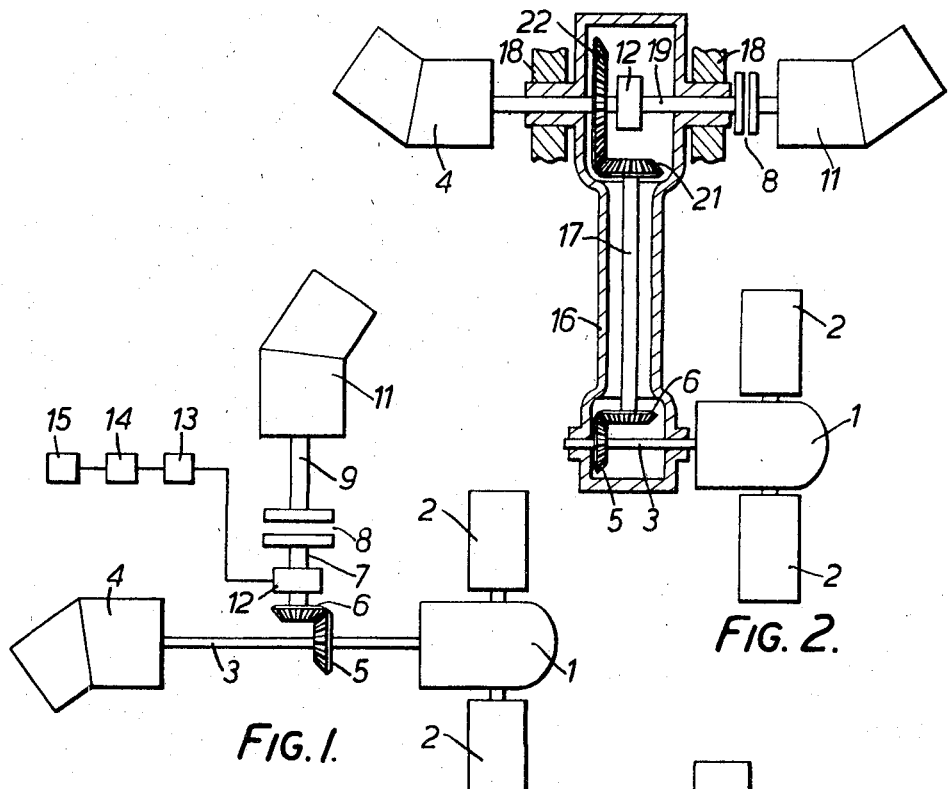
FIG. 1.
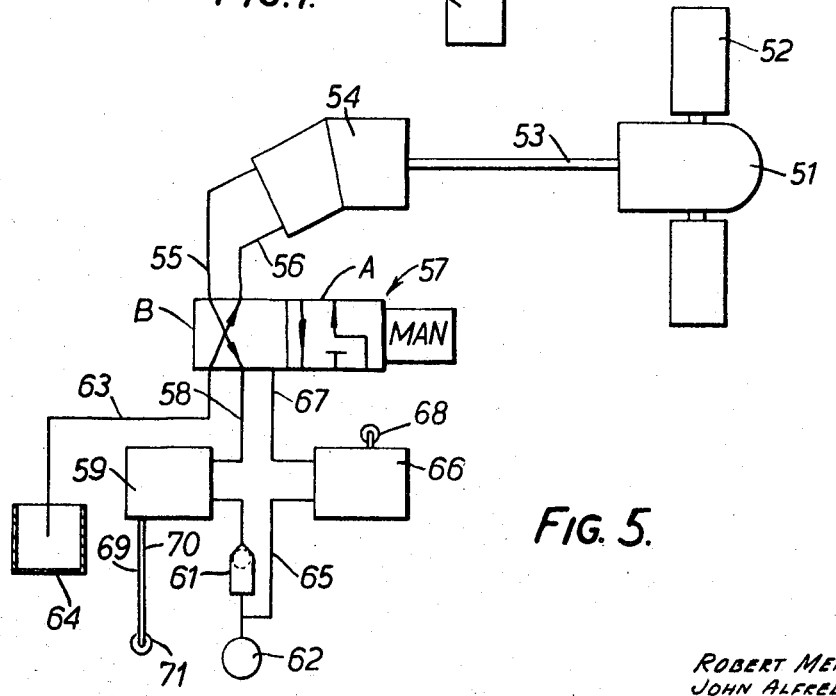
FIG. 2.
FIG. 5.
ROBERT MEHEW BASS
JOHN ALFRED CHILMAN
INVENTORS
BY Young & Thompson
ATTORNEYS

TURBINE-TESTING APPARATUS

This invention relates to speed-governed turbines in combination with rotary devices operable for testing the turbines when not being driven by their normal motive fluid. The turbines are of the kind having a variable-pitch bladed rotor and a speed-governing mechanism normally operative to adjust the pitch of the blades between their low-pitch position and their high-pitch position thereby to govern the turbine rotational speed when there is a variation of motive fluid speed through the turbine and/or variation in the mechanical load driven by the turbine. The governed speed may be any speed falling within a narrow speed band.

Turbines of this kind may be used on aircraft as a means providing an emergency power supply, being brought into operation by movement of the turbine from a stowed position within the aircraft into an extended position in the aircraft slipstream. Examples of such governed turbines are shown in the specifications of our prior U.K. Pat. Nos. 939,507 and 987,032.

According to this invention there is provided in combination, a turbine, a governor adapted to govern the speed of the turbine by varying the pitch of the turbine blades between their low-pitch position and their high-pitch position, a rotary device connectable to rotate the hub of the turbine and thereby the blades, for testing the turbine, and means adapted to indicate the attainment of the governed speed when the turbine is driven by the device and the power delivered by the device is increased beyond that which the turbine can absorb with the blades in the low-pitch position.

The rotary device may be normally driven by the turbine to translate the mechanical power delivered by the turbine into a second form of power.

The rotary device may be a hydraulic machine connected to a hydraulic circuit by a valve having a first position, the device when said valve is in the first position being operable as a motor to drive the hub, and said valve having a second position, the device when said valve is in the second position being operable as a pump driven by the turbine.

Means may be provided for indicating pumping operation of the pump during rundown of the hydraulic machine when the valve is switched from its first position to its second position, the kinetic energy stored in the turbine driving said machine as a pump.

The rotary device may be mechanically connectable to the turbine to drive the turbine. The mechanical connection may include a clutch of the friction type.

The rotary device may be operable from a power pack through means so flexible as to enable the device to be connected to, and disconnected and positioned away from, the turbine.

Further indicating means may be provided operative to indicate speeds below the governed speed and to indicate speeds above the governed speed.

Also according to the invention there is provided in combination, a speed-governed turbine, a rotary device capable of operation as a variable-speed motor or as a mechanical power translation machine for translating mechanical power delivered by the turbine into a second form of power, power-switching means having two operative positions which, in the first position is adapted to supply power in the second form to the rotary device from a source whereby to cause the rotary device to act as a motor to drive the turbine and, in the second position, connects the rotary device to a load (which may be associated with the source) and speed-indicating means for the turbine capable of indicating at least in the said first position of the power-switching means whether the turbine speed is at its governed value, the power-switching means being capable of changes from the first to the second position in such manner that the kinetic energy acquired by the turbine with the said means in the first position will cause operation of the rotary device to convert the kinetic energy into the second form of power with said means in the second position.

A special indicator may be provided to indicate whether or not the rotary device is correctly operative when driven by turbine kinetic energy in the second position of the power-switching means.

The speed-governed turbine may be a ram-air turbine installed in an aircraft.

Also according to the invention there is provided a method of testing a speed-governed turbine in which the turbine is connected to a rotary device and is driven at a speed where the pitch of the blades is between the fine and feathered positions, a signal being produced if and when a governed speed has been attained by the turbine.

Figure 4:
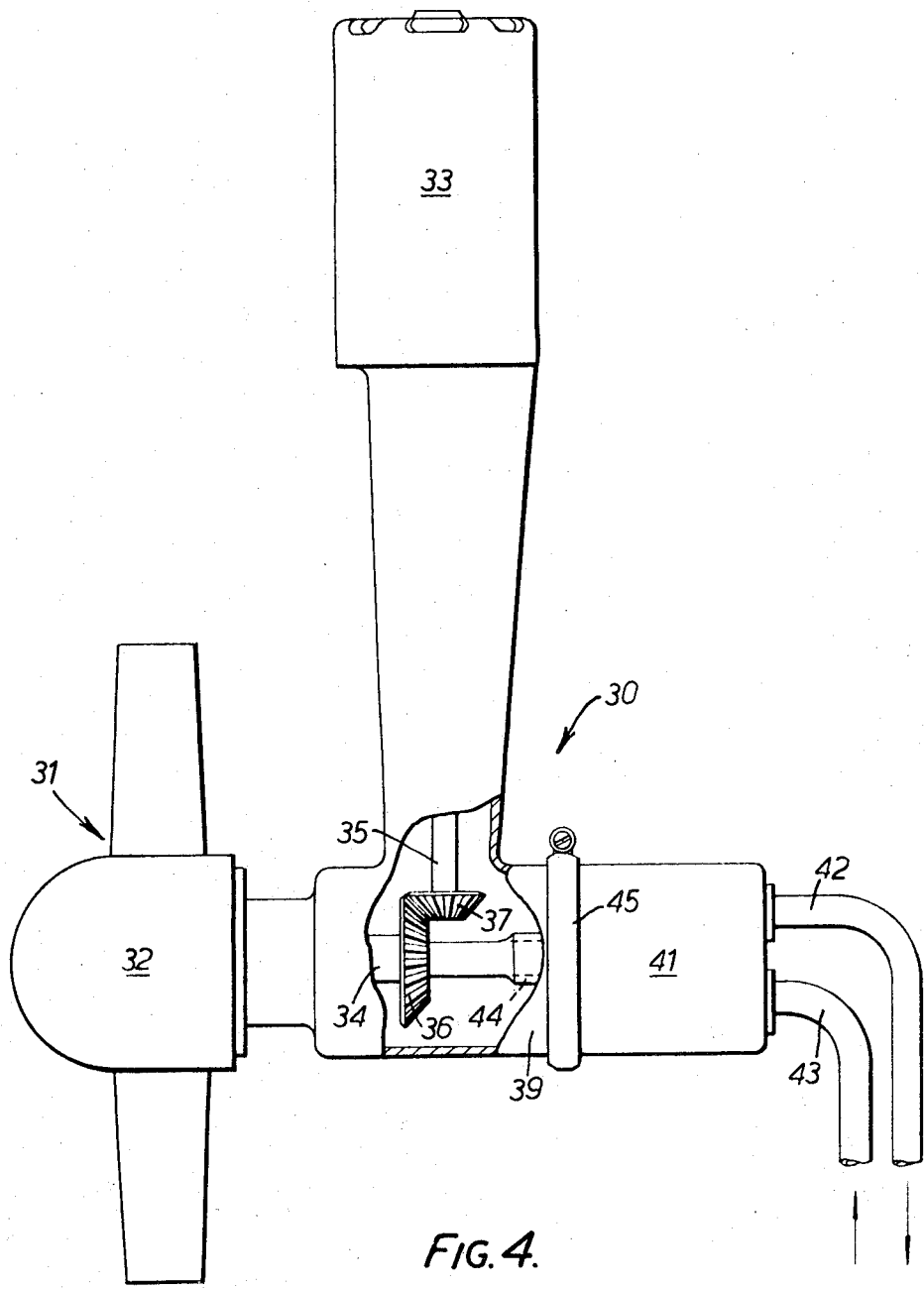

Four embodiments of the invention will now be particularly described by way of example with reference to the accompanying drawings, of which, FIG. 1 shows a ram-air turbine unit with testing apparatus in accordance with the first embodiment, FIG. 2 shows a ram-air turbine unit with testing apparatus in accordance with the second embodiment, FIGS. 3 and 4 show a ram-air turbine unit with part of the testing apparatus in accordance with the third embodiment, and, FIG. 5 shows a ram-air turbine unit with testing apparatus in accordance with the fourth embodiment.

Referring to FIG. 1 of the drawings, a ram-air turbine unit, used as an emergency power supply on an aircraft, comprises a rotatable hub 1 from which a plurality of blades 2 project radially, the blades being adjustable about their longitudinal axes to vary their pitch. The hub 1 contains a speed-responsive mechanism responding to the speed of rotation of the air turbine and adjusting the pitch of the blades 2 in between a fine pitch stop and a feathered stop in the sense that when the turbine is extended into the slipstream of the aircraft the pitch of the blades will be adjusted to maintain the turbine at a constant speed. A drive shaft 3 extends from the hub of the turbine and drives a load device comprising a hydraulic pump 4 of the variable positive-displacement type whose displacement reduces with increasing delivery pressure. Any other load device may be driven by the turbine. The hydraulic pump 4 is connected to a hydraulic circuit within the aircraft such for example, as power controls, which need to be continuously supplied with hydraulic power for control of the aircraft. On the shaft 3 a bevel gear 5 is mounted which is in mesh with a bevel gear 6 carried by a shaft 7 extending approximately at right angles to the shaft 3. The shaft 7 extends to a coupling device in the form of a friction clutch 8 which is driven by a shaft 9 extending from a positive displacement hydraulic motor 11. The motor 11 is driven by hydraulic pressure liquid from the aircraft hydraulic system. The shaft 7 carries a speed-indicating means 12 of any conventional type, either mechanical, hydraulic, electrical or electronic. If the means 12 is electronic, it preferably includes two tuned circuits responding to the upper and lower speeds of a narrow governed band. The speed-indicating means 12 controls the operation of three indicator lamps 13, 14 and 15 within the aircraft.

The whole turbine is mounted in the aircraft for extension into the airstream by operation of a suitable manual control within the aircraft. For test purposes the manual control is in the form of a three-position switch (not shown) having start, stop and off positions. The turbine may be tested when the aircraft is on the ground and under normal circumstances such a test will be made just prior to takeoff. Initially, the turbine is extended and the switch is moved to the start position. The switch will close an electric circuit to cause engagement of the clutch 8. Engagement of the clutch 8 will operate a limit switch (not shown) which in turn will operate an electrohydraulic valve (also not shown) to supply liquid at pressure to the motor 11. The motor will then rotate, driving the turbine through the clutch 8 and the bevel gears 5 and 6. Immediately on switching to the start position, the lamp 13 will light to indicate an underspeed condition. After holding the switch in this position for a few seconds or a predetermined time period, the turbine speed will increase and the governor within the turbine hub 1, operating on the pitch of the blades 2, will cause the blade pitch to move away from the fine pitch stop, thus increasing resistance to rotation. As the governed speed is attained, the lamp 14 will light and the lamp 13 will go out. If the lamp 14 goes out and if the lamp 15 subsequently lights, it will be clear to the aircraft pilot that the turbine is overspeeding and that there is a fault in the turbine or in the pump driven by the turbine, and appropriate action will be taken. If the test is successful, the switch is moved to the stop position and the clutch 8 will disengage, while the motor is rotating. The turbine will slow down and the lamp 13 will then light, proving that the clutch has disengaged. The switch is then moved to the off position to stop the motor. The turbine is then retracted into the aircraft. During testing of the turbine, the delivery pressure of the pump 4 should also be checked to prove that the pump is operative. The motor 11 should be of such power as to be capable of driving the turbine to the governed speed, with the blades between their low-pitch and high-pitch positions, but not excessively powerful as to swamp the governing effect. In a typical air turbine the driving power required varies from 5 to 80 horsepower with increase in turbine speed to the governed value, i.e., from the fine pitch stop to the feathered stop, and the pump 4 if fully loaded can absorb 50 horsepower. Since during test the pump 4 is unloaded, it is reasonable that the motor 11 should be of about 50 horsepower.

With reference now to the second embodiment of the invention as shown in FIG. 2, the turbine hub 1 and the blades 2 are carried by a shaft 3 rotatably mounted at the outer end portion of a pivoted arm 16. The arm 16 is hollow and contains a drive shaft 17 engaged be bevel gears 5 and 6 with the turbine shaft 3. The arm 16 is carried in trunnions 18 with the aircraft and is capable of rotating about the trunnions for extending or retracting the turbine. In between the trunnions 18, the shaft 17 drives a power output shaft 19 by means of bevel gears 21 and 22. The shaft 19 is coaxial with the trunnions 18. The shaft extends through the trunnions to drive the pump 4. Also the shaft extends oppositely through the trunnions to the clutch 8 and the motor 11. The testing procedure is as described for the FIG. 1 embodiment.

Referring now to the third embodiment of the invention, as shown in FIGS. 3 and 4, a ram-air turbine unit 30 includes a bladed rotor 31, the hub 32 of which houses hydraulically operable pitch-change mechanism (not shown), pitch-change being under governor control in a manner similar to the constructions of FIGS. 1 and 2. As shown, the bladed rotor 31 drives an alternator 33 through suitable shafting 34 and 35 which carries meshing bevel gears 36 and 37. The shaft 34 extends to the rear face 38 of the casing portion 39 of the unit 30, and its end portion at this face is hollow and provided with internal splines (not shown). A removable cover plate 40 is provided for fitment in suitable manner to the rear face 38, and this plate is only removed when it is required to test the unit.

Although not shown in FIGS. 3 and 4, the unit is arranged for pivotal mounting upon an aircraft so as to be retractable from a position in the aircraft slipstream into a stowed position in a suitable zone within the aircraft structure.

A rotary device in the form of an hydraulic motor 41, forming part of ground equipment, is used for testing the ram-air turbine unit. This motor is powered from a suitable hydraulic powerpack housed in a ground trolley (not shown) which can be brought close to the aircraft. Flexible inlet and exhaust pipes 42 and 43 are taken from the powerpack to the motor so that with the cover plate 40 removed from the unit the motor can be offered up, as shown in FIG. 3, to the unit, its externally splined shaft 44 fitting into the internally splined hollow shaft 34, and a clamp ring 45 being fitted to lock the motor to the casing portion 39. The unit with the motor fitted is shown in FIG. 4.

Testing the ram-air turbine unit 30 can then proceed in the manner described in the first embodiment, the difference in this embodiment being the fact the motor can be removed completely from the aircraft when testing is completed, it being unnecessary for the aircraft to carry the motor and the means for providing it with hydraulic power.

The cover plate 40 is replaced before the ram-air turbine unit is retracted prior to takeoff of the aircraft.

Referring now to the fourth embodiment of the invention shown in FIG. 5, the governed turbine is again of the kind provided for an aircraft and capable of being deployed into the airstream of the aircraft under emergency conditions in order to drive a mechanical energy translation device such as a hydraulic pump or an alternator in order to provide hydraulic or electrical power for essential services in the aircraft.

The turbine itself comprises a rotatable hub 51 from which a plurality of blades 52 project radially, the blades being adjustable about their longitudinal axes to vary their pitch. The hub 51 contains a speed-responsive mechanism responding to the speed of rotation of the air turbine and adjusting the pitch of the blades 52 between a fine stop and a coarse stop in the sense that when the turbine is extended into the aircraft slipstream the pitch of the blades will be adjusted to maintain the turbine at a constant speed. The drive shaft 53 extends from the hub of the turbine and drives the mechanical power translation device which in this case is a hydraulic pump 54. The pump 54 has flow and return connections 55 and 56, and in operation of the pump as a pump the connection 55 delivers pressure liquid into the aircraft system and the connection 56 has liquid at low pressure from a reservoir within the aircraft.

The testing apparatus within the aircraft includes a power-switching means 57 which in this instance takes the form of a two-position manually operated valve. This valve is shown in the conventional symbolic manner by a slider having two operative sections A and B. As illustrated, the section B is in position and this corresponds to the second operative position of the valve. In this case the delivery connection 55 of the pump will connect through a pipe 58, a pressure-sensing device 59 and a nonreturn valve 61 to the aircraft hydraulic pressure connection 62. The return pipe 56 of the pump will be connected to the pipe 63 in the aircraft which in turn is connected to the aircraft reservoir 64.

Thus, in the second position when the pump 54 acts as a pump, it will take liquid from the aircraft reservoir and deliver it at pressure to the aircraft connection 62.

When the section A of the valve is in the operative position, the valve is in its first position and the flow pipe 55 is now directly connected to the reservoir pipe 63 within the aircraft. The return pipe 56 is now effectively the pressure flow pipe into the pump 54 and it receives its liquid at pressure from the aircraft hydraulic supply 62 through a pipe 65, a speed-indicating means in the form of a flow-rate-indicating device 66, and a pipe 67. The flow-rate-indicating device 66 is intended to indicate the speed of liquid flow to the pump 54 when it is operated as a motor, thus to form the speed-indicating means.

When the described embodiment is in position on an aircraft and it is desired to test the turbine when the aircraft is on the ground, the turbine will be deployed by a manual control into its operative position. If the aircraft were flying, the turbine would of course be in the slipstream and would be driven. However, since the aircraft is on the ground, there is no slipstream and the turbine will not rotate. The valve 57 is then moved to its first position in which hydraulic liquid at pressure is supplied from the aircraft source 62 through the flow-rate-indicating device 66 and into the pipe 56 of the pump. The delivery connection 55 from the pump is in communication through the valve directly to the reservoir connection 63. The pump 54 will therefore act as a motor and will rotate the turbine. The speed of rotation of the turbine is indicated by the flow-rate-indicating device 66 which includes an indicator lamp 68. As soon as the pump has driven the turbine to its governed speed the indicator lamp of the device 66 lights to establish that this governed speed has been reached and provided the lamp stays on proves that the governor is operating correctly. The valve 57 is then switched to the second position in which the section B will connect the pump flow line 55 to the aircraft hydraulic supply through the pressure-sensing device 59 which is connected by leads 69, 70 to 71, and the nonreturn valve 61, and will connect the return pipe 56 to the aircraft reservoir 64. The kinetic energy of the turbine will then drive the pump 54 as a pump and it will deliver liquid at pressure for a short time into the aircraft hydraulic system which will be indicated by lighting of the lamp of the pressure-sensing device 59. In this example the aircraft hydraulic system will form the load. It is then proved that the turbine and the pump are serviceable, and when the turbine has come to rest it will be stowed. The stowing will not alter the position of the valve 57 from its second position, and while the aircraft hydraulic system is in normal use the nonreturn valve 61 will prevent access of pressure liquid to the pump 54.

If, during motor operation, the indicator lamp of the device 66 comes on momentarily, but then goes out, this would (neglecting bulb failure) indicate failure of the governor to operate correctly, with the likelihood of turbine overspeeding.

The deploying of the turbine for emergency use is preferably made independent of the aircraft pilot by means of a simple automatic device which responds to failing of the hydraulic pressure source within the aircraft to cause deploying of the turbine into the airstream. There is of course a manual override control for deploying the turbine when the aircraft is airborne. Ground testing should provide a test for automatic turbine deployment. Automatic deployment of the turbine is preferably rendered inoperative, when the aircraft is landing or is on the ground, by a switch which responds either to throttling back of the aircraft engines or to switching off of fuel to the engines.

The flow-rate-measuring device may take any convenient form. As an alternative to the illustrated flow-rate-indicating device 66 an electrical speed-indicating means may comprise a pulse generator provided on the turbine which is electrically connected to a speed indicator in the aircraft. In this latter case a logic device may be provided to cause the indicator to show correct governor operation if the speed is within a predetermined tolerance, say ±5 percent of the nominal governed speed.

If the mechanical power translation device is a dynamo or an alternator, the power-switching means will clearly comprise an electrical switch manually operable during the testing procedure.

Although in the above-described embodiments the rotary devices forming part of the testing apparatus have comprised hydraulically operable motors, in alternative embodiments of the invention these rotary devices may comprise other types of motor, for example, motors operable by compressed air, compressed gas, or by any other suitable means.

We claim:
1. In combination, a speed-governed turbine, a rotary device capable of operation as a variable-speed motor or as a mechanical power translation machine for translating mechanical power delivered by the turbine into a second form of power, a source of power in said second form, a load, power-switching means having two operative positions which in the first position is adapted to supply power in the second form from said source to the rotary device whereby to cause the rotary device to act as a motor to drive the turbine and, in the second position, connects the rotary device to said load, and speed indicator means for the turbine capable of indicating at least in the said first position of the power-switching means whether the turbine speed is within its governed range, the power-switching means being capable of changes from the first to the second position in such manner that the kinetic energy acquired by the turbine with the said means in the first position will cause operation of the rotary device to convert the kinetic energy into the second form of power with said means in the second position.

2. The combination of claim 1 having a sensing device, responsive to operation of said rotary device, an indicator and means connecting said sensing device and said indicator, such that said indicator can indicate whether or not the rotary device is correctly operative when driven by turbine kinetic energy in the second position of the power-switching means.

3. In combination, a ram-air turbine installed in an aircraft and operable by the slipstream of that aircraft when in flight, a governor adapted to govern the speed of the turbine by varying the pitch of the turbine blades between their low-pitch position and their high-pitch position, a rotary device mechanical connecting means, by which said rotary device is connectable to rotate the hub of the turbine and thereby the blades for testing the turbine, speed indicator means, and transmission means connected between said device and said indicator means for conveying speed signals from the device to the indicator means, said rotary device being normally driven by the turbine when so operated by the slipstream to translate the mechanical power delivered by the turbine into a second form of power, and said rotary device, when the turbine is not operated by the slipstream, being operable to drive the turbine whereupon when the power delivered by the device is increased beyond that which the turbine can absorb with the blades in the low-pitch position, the governor is operative to effect increase in the pitch of the blades whereby the turbine can rotate at a predetermined governed speed and the speed indicator means can indicate the attainment of that governed speed.

4. The combination of claim 3 in which the rotary device is a hydraulic machine, said combination also including a hydraulic circuit having a source of hydraulic liquid under pressure, and a two-position valve, the machine being connected to the hydraulic circuit by said valve, and said device, when said valve is in its first position, being operable from said source as a motor to drive the hub, and the device, when said valve is in its second position, being operable as a pump driven by the turbine to supply said hydraulic circuit with hydraulic liquid under pressure upon failure of said source.

5. The combination of claim 4 further including ducting between said machine and said circuit, a pressure-sensing device provided in said ducting, an indicator, and means connecting said pressure-sensing device and said indicator, so that when the valve is switched from its first position to its second position and the machine then in consequence runs down, the kinetic energy stored in the turbine drives said machine as a pump, and the pressure-sensing device is operable to activate the indicator to verify pump operation.

6. A method of testing a speed-governed turbine having variable-pitch blading with a rotary device for test driving the turbine and speed indicator means associated therewith, said method comprising,
 a. driving the turbine by the rotary device,
 b. connecting said rotary device to a power source and rotating it under the power derived from that source whereby the turbine is rotated,
 c. increasing the power supply from said source to the device until the turbine reaches a rotational speed at which the governor of the turbine operates to adjust blade pitch between fine-pitch and the feathered condition whereby the turbine reaches a rotational speed predetermined by the setting of the governor, and,
 d. said speed indicator means giving a visual indication as and when said predetermined rotational speed is reached.

7. A method of testing a speed-governed turbine as claimed in claim 6, said rotary device being a hydraulic machine and having further indicator means associated therewith, said method comprising,
 a. operating the hydraulic machine in one mode as a motor so that it drives the turbine for testing it when the turbine is not powered by its normal source of motive fluid,
 b. operating the hydraulic machine in another mode as a pump when the turbine is being powered by its normal source of motive fluid,
 c. causing the said machine, in said one mode of operation when it has caused the turbine to attain said predetermined rotational speed, to be inoperative as a motor driving the turbine, kinetic energy remaining in the turbine being caused to effect operation of the hydraulic machine in its other mode as a pump, and, d. said further indicator means then verifying pump operation.

8. In combination, a ram-air turbine installed in an aircraft and operable by the slipstream of that aircraft when in flight, a governor adapted to govern the speed of the turbine by varying the pitch of the turbine blades between their low-pitch position and their high-pitch position, a rotary device, mechanical connecting means, by which said rotary device is connectable to rotate the hub of the turbine and thereby the blades for testing the turbine, so installed, when said aircraft is inoperative, speed indicator means, and transmission means connectable between said rotary device and said indicator means for conveying speed signals from that device to the indicator means, wherein when said rotary device so rotates the turbine for testing and the power delivered by the rotary device is increased beyond that which the turbine can absorb with the blades in the low-pitch position, the governor is operative to effect increase in pitch of the blades whereby the turbine can rotate at a predetermined governed speed and the speed indicator means can indicate the attainment of that governed speed.

9. In combination, a ram-air turbine installed in an aircraft and operable by the slipstream of that aircraft when in flight, a governor adapted to govern the speed of the turbine by varying the pitch of the turbine blades between their low-pitch position and their high-pitch position, a first rotary device, clutch means, by which said first rotary device is connectable to rotate the hub of the turbine and thereby the blades for testing the turbine, so installed, when said aircraft is inoperative, speed indicator means, transmission means connectable between said first rotary device and said indicator means for conveying speed signals from that device to the indicator means, a second rotary device, and mechanical coupling means by which said second rotary device is connected to said turbine for rotation therewith, whereby when the turbine is operated by the slipstream the second rotary device, driven thereby, is operable to translate the mechanical power delivered by the turbine into a second form of power, but when, with the aircraft inoperative, the turbine is not operated by the slipstream, said first rotary device is operable to drive the turbine and said second rotary device for testing through said clutch means, whereupon when the power delivered by said first rotary device is increased beyond that which the turbine can absorb with the blades in the low-pitch position, the governor is operative to effect increase in the pitch of the blades whereby the turbine can rotate at a predetermined governed speed and the speed indicator means can indicate the attainment of that governed speed.

10. The combination of claim 9 having further indicating means operative to indicate speeds below the governed speed and to indicate speeds above the governed speed.

11. In combination, a ram-air turbine installed in an aircraft and operable by the slipstream of that aircraft when in flight, a governor adapted to govern the speed of the turbine by varying the pitch of the turbine blades between their low-pitch position and their high-pitch position, a first rotary device, mechanical connecting means, by which said first rotary device is connectable to rotate the hub of the turbine and thereby the blades for testing the turbine, so installed, when said aircraft is inoperative, speed indicator means, transmission means connected between said device and said indicator means for conveying speed signals from that device to the indicator means, clamp means, whereby said first rotary device is readily attachable to and detachable from the turbine, a powerpack, flexible coupling means connectable between said first rotary device and said powerpack, a second rotary device, and mechanical coupling means by which said second rotary device is connected to said turbine for rotation therewith, whereby when the turbine is operated by the slipstream the second rotary device, driven thereby, is operable to translate the mechanical power delivered by the turbine into a second form of power, but when, with the aircraft inoperative, the turbine is not operated by the slipstream, said first rotary device is movable by virtue of said flexible coupling means towards said turbine and connectable thereto by said mechanical connecting means, being clamped with respect thereto by said clamp means, whereby upon operation of said powerpack operation of said first rotary device is effected and said turbine and said second rotary device are driven thereby for testing, whereupon when the power delivered by said first rotary device is increased beyond that which the turbine can absorb with the blades in their low-pitch position, the governor is operative to effect increase in the pitch of the blades whereby the turbine can rotate at a predetermined governed speed and the speed indicator means can indicate the attainment of that governed speed.

* * * * *